Jan. 3, 1933.  E. W. KNOWLTON  1,893,371
CONTROL DEVICE FOR SIGNALS
Filed June 29, 1931  2 Sheets-Sheet 1
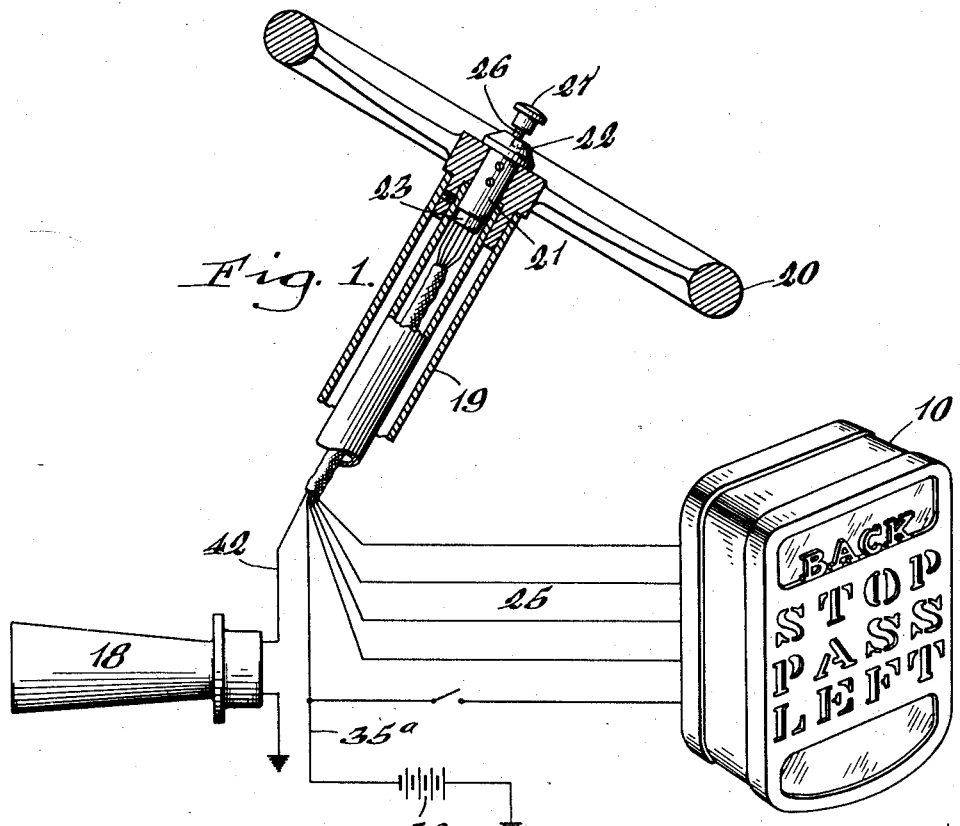
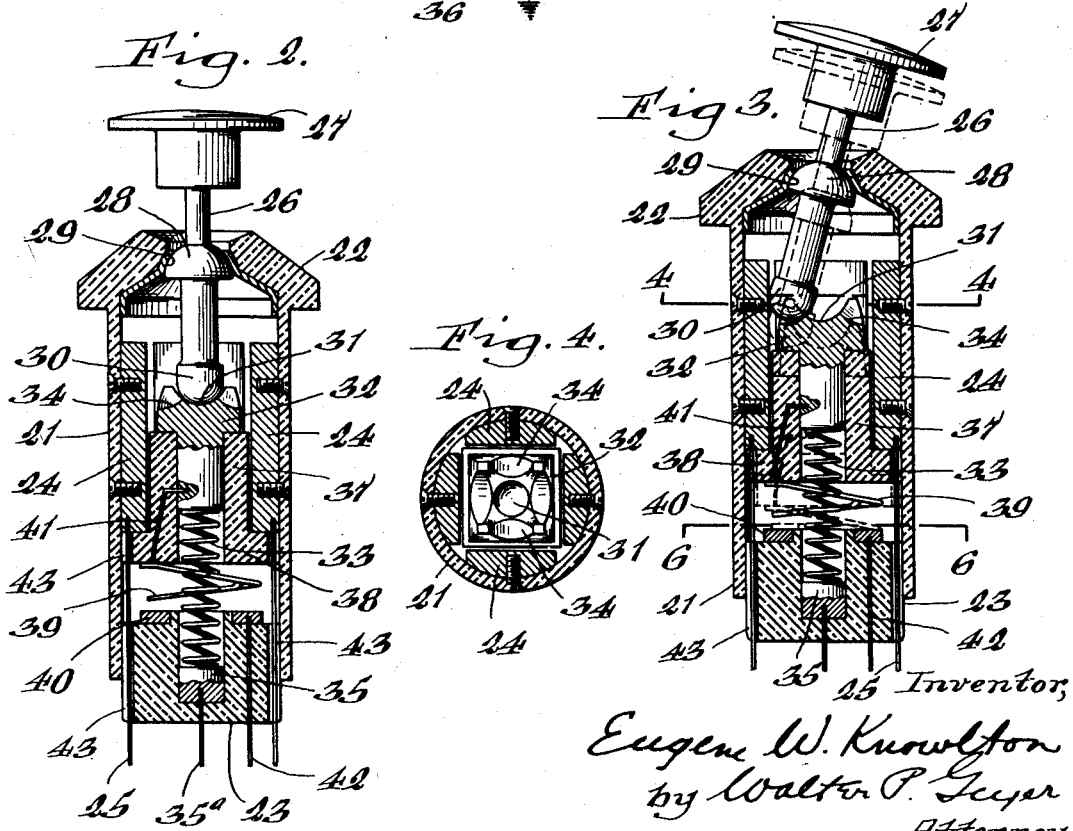
Inventor,
Eugene W. Knowlton
by Walter P. Geyer
Attorney.

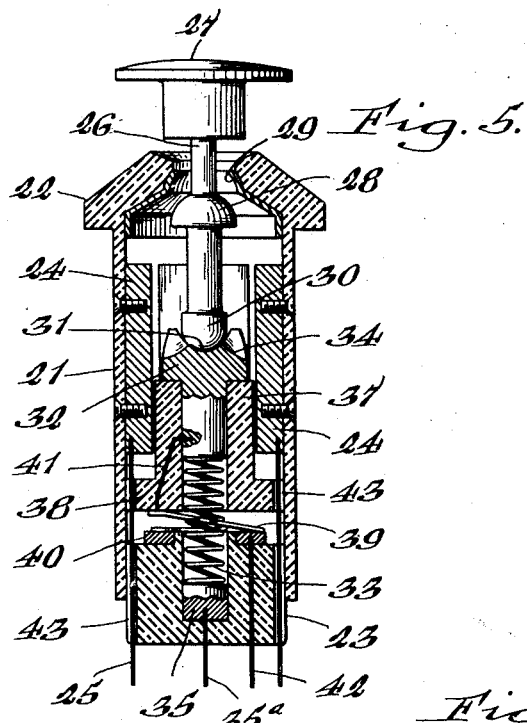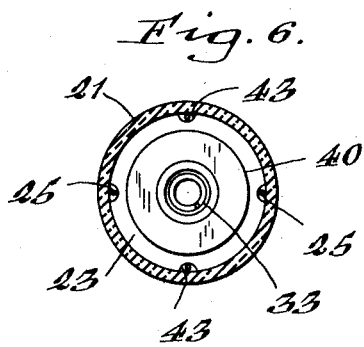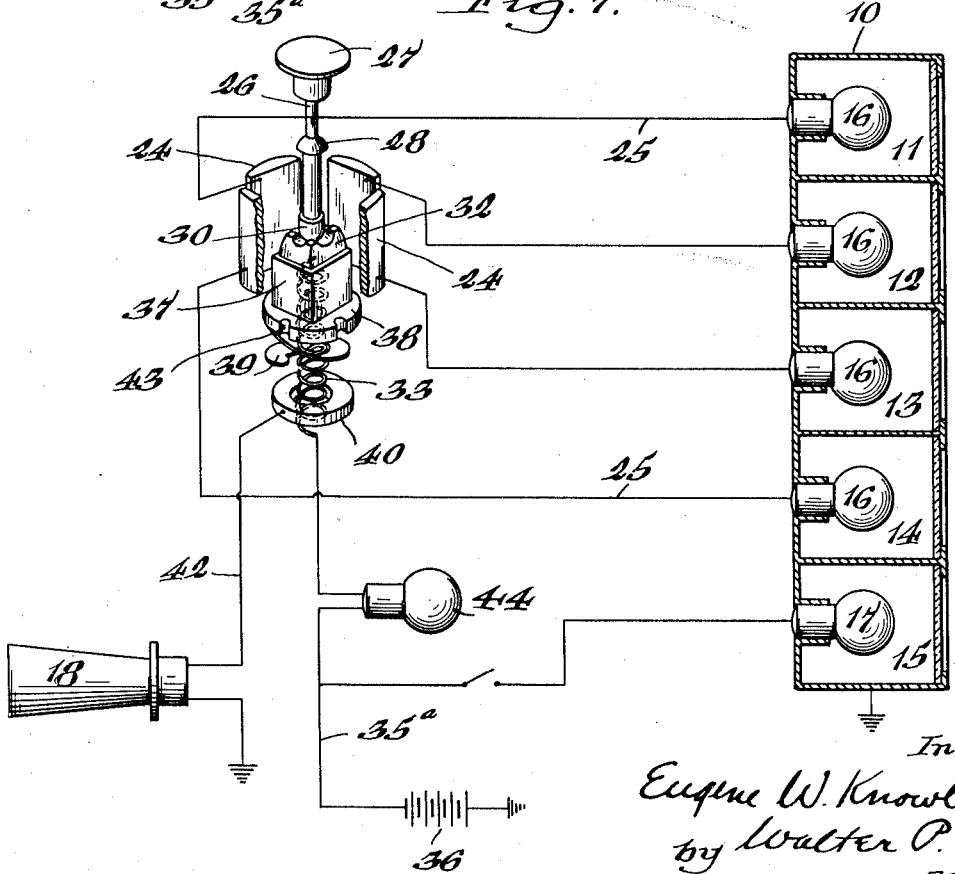

Patented Jan. 3, 1933

1,893,371

UNITED STATES PATENT OFFICE

EUGENE W. KNOWLTON, OF BUFFALO, NEW YORK

CONTROL DEVICE FOR SIGNALS

Application filed June 29, 1931. Serial No. 547,481.

This invention relates generally to signals such as are used on motor vehicles, but more particularly to a control device for governing the display of the various signal indications at the will of the driver.

It has for its chief object the provision of a unitary control device by which the driver of the vehicle may conveniently bring into operation a desired signal with a minimum of effort and without in any way detracting attention from his driving.

Another object of the invention is to provide a control device for vehicle signals which is simple, compact and inexpensive in construction, and whose parts are so organized and arranged as to be effective and reliable in operation, and wherein a single control element is employed for governing the various signaling positions.

A further object is the provision of a universal electric switch for governing various illuminated signal indications, such switch being designed to permit the simultaneous operation of the vehicle horn in conjunction with any of its signal display positions, as well as permit blowing of the horn independently of the operation of the signals.

In the accompanying drawings:—

Figure 1 is a sectional view of the steering column of a vehicle showing my improved control device applied thereto, the connection from the device to the signal and horn being shown diagrammatically. Figure 2 is a longitudinal section of the control device showing the same in its neutral or inoperative position. Figure 3 is a similar view showing the control device set in one of its signal indicating positions. Figure 4 is a horizontal section taken on line 4—4, Figure 3. Figure 5 is a longitudinal section of the control device showing the same in position for blowing the horn of the vehicle. Figure 6 is a horizontal section taken on line 6—6, Figure 3. Figure 7 is a diagrammatic view showing the electrical connections of the device.

Similar characters of reference indicate corresponding parts throughout the several views.

By way of example, I have shown my control device in connection with a vehicle signal, the signal depicted in Figures 1 and 7 consisting of a suitable case 10 having a series of compartments 11, 12, 13, 14 and 15 and indicating respectively "back", "stop", "pass", and "left", the lower one 15 constituting the tail light compartment. Arranged in each of these compartments 11, 12, 13, and 14 is an electric lamp 16 which is included in an electric circuit adapted to be controlled by my invention. In the tail light compartment 15 is an electric lamp 17 which is included in the customary lighting circuit of the car and is separate and independent from the signal control circuit. Included in the latter circuit and also controlled by my improved device is a horn 18.

The control device may be located at any convenient station of the vehicle to facilitate its ready control by the driver, and by way of example I have shown the same as applied to the steering column 19 adjacent the hub of the steering wheel 20, and as this is the usual location of the horn-controlling button of the vehicle, I simply replace said button with my control device. In the preferred construction of my invention shown in the drawings, it consists of a casing 21 of insulating material, in which its operative parts are arranged, and the same is applied to the steering column in any appropriate manner, and terminating at its upper end in a flange or collar 22 which abuts against the upper end of the steering wheel hub. At its lower end this casing is closed with a plug 23 which may be secured thereto by a pressed fit or otherwise.

Applied to the inner wall of the casing 21 adjacent its upper end are a plurality of contact bars 24, four being shown in the drawings, which are disposed equi distant around the casing, and as shown in Figure 4 their inner or contact faces are straight and collectively form a substantially square opening. Each contact bar constitutes one of the elements of a multiple switch, and each is connected by a wire 25 to one of the lamps 16 included in the signal control circuit. Mounted for universal movement in the upper end of the casing 21 is a control member or lever 26, which constitutes the companion element of the control switch and which is made of conductive material, the upper end of the same having a control head or button 27 thereon. Intermediate its ends this control lever has a knuckle 28 about which it is adapted to fulcrum and this knuckle engages a downwardly facing socket 29 applied to the casing head 22. At its lower end the control lever 26 has a contact head 30 whose bottom side is preferably semi-spherical in shape and is normally adapted to engage a correspondingly shaped seat or depression 31 formed in the top side of a block 32 which is normally held upwardly against the contacting lower end of the lever by a coil spring 33. This spring also acts to maintain the knuckle of the lever in operative engagement with its socket 29. As shown in Figures 2, 3 and 4, said block 32 is provided in its top marginal edge with notches 34 which communicate with the central depression 31 and are disposed opposite the respective contact bars 24. The spring 33 is axially in line with the fulcrum of the lever 26 and the same has a tendency to yieldingly resist movement of the lever out of its neutral position seen in Figure 2.

By this construction, when it is desired to bring into operation one of the indications borne by the signal casing 10, the driver shifts the lever 26 about its fulcrum to bring its contact-head 30 into electrical engagement with one or another of the contact bars 24 which are connected to the corresponding lamps 16 in the signal casing. In addition to the contact bars 24, control lever 26, wires 25 and lamps 16, this control circuit includes the block 32, which is for this purpose made of a suitable conductive material, the spring 33 which is fixed at its upper end in the opposing lower end of the block, a terminal 35 seated in the plug 23 and to which the lower end of the spring is electrically connected, and a feed wire 35ª connecting such terminal with the source of electric energy, which may be a battery 36. Thus, whenever the lever 26 is shifted to a position to indicate a given signal, as for example, to the position shown by full lines in Figure 3, the circuit is closed through the corresponding signal lamp 16, such circuit including the feed wire 35ª, terminal 35, spring 33, block 32, lever contact-head 30, corresponding contact bar 24 and its wire 25 to the lamp. In the drawings, the other terminals of the lamps 16 and the corresponding battery post are grounded.

The lever-contacting block 32 is preferably carried by an insulating sleeve 37 which extends upwardly into the square opening resulting from the disposition of the contact bars 24 and terminates at its lower end in a stop flange 38 which normally abuts against the lower edges of said contact bars, as seen in Figure 2. By this construction, the block 32 is adapted to be displaced downwardly against the resistance of the spring 33 whenever the control lever 26 is shifted into and out of a signal controlling position, and at the same time the sleeve 37 guides the contact head in an axial path and prevents its shifting laterally. Furthermore, the insulating sleeve is of larger diameter than that of the block 32 and danger of short circuiting is thereby prevented.

This control lever 26 is also adapted to control the operation of the horn 18, and this is preferably effected by merely depressing the lever axially downward to the position shown in Figure 5. This action results in the closing of an electric circuit including the horn and for this purpose the block-insulating sleeve 37 carries a depending yieldable switch contact 39 which is adapted to engage a companion contact 40 applied to the upper side of the plug 23, which latter is preferably made of insulating material. The yieldable switch contact 39 is connected at its upper end by a conductor 41 with the shank of the contact block 32, as seen in Figures 2, 3 and 5. Thus, in the horn blowing position of the control lever 26, the circuit is closed across the switch contacts 39, 40 and the path of the circuit includes the lead wire 35ª, terminal 35, spring 33, contact block 32, conductor 41, yieldable contact 39, fixed contact 40 and the wire 42 connecting the latter with the horn 18. When the control lever is released, the spring 33 forces the same to its elevated neutral position shown in Figure 2, in which the circuit including the various signal elements, as well as that of the horn, are open.

The wires 25 which connect the contact bars 24 of the signal lamps preferably extend downwardly from such bars adjacent the inner wall of the casing 21 and to permit this the plug 23 and sleeve-flange 38 may be provided with registering wire-receiving grooves 43.

When it is desired to blow the horn simultaneously with the act of displaying a given signal, this is readily accomplished by merely depressing the lever 26 while its contact-head 30 is in sliding electrical engagement with the corresponding contact bar 24.

A pilot or tell-tale lamp 44 may be included in the signal circuit and positioned on the dash board of the vehicle for indicating to the driver that the signal is functioning properly. As seen in Figure 7, this pilot lamp is connected in series between the battery 36 and spring 33.

I claim as my invention:—

1. An electric switch of the character described, comprising a casing, a plurality of contact elements disposed circumferentially within the casing in insulated relation, a control lever mounted on said casing for universal movement relative thereto and having a contact head thereon adapted for selective and independent operative engagement with any one of said contact elements, and a socketed contact member included in the switch circuit for receiving the headed end of said lever and guided for axial movement in said casing, said socketed member including a spring for constantly urging it in firm contacting relation with the contact head of the lever in all positions thereof, whereby said lever is held in a given set position.

2. An electric switch of the character described, comprising a casing, a plurality of contact elements disposed circumferentially within the casing in insulated relation, a control lever mounted on said casing for universal movement relative thereto and having a contact head thereon adapted for selective and independent operative engagement with any one of said contact elements, and an axially-displaceable contact member having a central socket therein for normally receiving the headed end of said lever and having communicating notches in its marginal edge in alining relation with the corresponding casing contact element, whereby the contact head of the lever jointly engages one of said notches and the corresponding casing contact element in an operative circuit closing position of said lever.

3. An electric switch of the character described, comprising a casing having a downwardly-facing socket therein, a plurality of contact elements arranged in an annular row within said casing below its socket and in insulated relation, a supplementary contact element disposed axially of the casing and below said first-named contact elements, a switch control lever fulcrumed in the casing-socket and having a contact head at its lower end adapted for independent operative engagement with any one of the annularly-disposed contact elements, a yieldable contact member disposed axially of the casing and interposed between the headed end of said lever and said axially disposed contact element, said lever being displaceable downwardly out of its socket for shifting said yieldable contact member into circuit-closing position with the axially-disposed contact element.

4. An electric switch of the character described, comprising a casing having a downwardly-facing socket therein, a plurality of contact elements arranged in an annular row within said casing below its socket and in insulated relation, a supplementary contact element disposed axially of the casing and below said first-named contact elements, a switch control lever fulcrumed in the casing-socket and having a contact head at its lower end adapted for independent operative engagement with any one of the annularly-disposed contact elements, an axially-displaceable contact member interposed between the headed end of said lever and said axial contact element and having a socket in its top for receiving the headed end of said lever, and a spring included in the circuit of said displaceable contact member for normally urging the latter in contact with the headed end of the lever, said lever being displaceable downwardly out of its socket for shifting said displaceable contact member into circuit-closing position with the axially disposed contact element, the contact head of said lever being engageable with said annularly disposed contact elements in either its normally elevated or downwardly displaced position.

5. An electric switch of the character described, comprising a substantially tubular casing, a plurality of contact elements arranged within said casing, one of said elements being disposed lengthwise of the casing along its inner wall and the other element being disposed crosswise thereof and below the companion element, a laterally and axially displaceable control lever applied to the casing and having a contact head engageable with said longitudinal contact element, a socketed contact member interposed between the lower end of said lever and said axial contact element and in the socket of which the lever contact head is adapted to normally seat, said contact member carrying a switch contact complementary to and engageable with the transverse contact element of the casing when said lever is displaced axially of the casing, and yieldable means for normally maintaining the socketed contact member and the control lever in their elevated position.

6. An electric switch of the character described, comprising a substantially cylindrical casing, a plurality of contact elements arranged therein about its axis in insulated relation, a universally movable control lever fulcrumed on said casing and having a contact head at its lower end for independent operative engagement with any one of said contact elements, and a yieldable bearing block displaceable axially of the casing in response to shifting movements of the lever and containing a socket in which the lever contact head is adapted to normally seat, said block having notches in its marginal edge opening into said socket and in registering relation with the corresponding contact elements in the casing for permitting of the passage of the lever contact head into and out of engagement with said contact element, said notches latching the control lever in a given switch-closing position.

7. An electric switch of the character described, comprising a substantially cylindrical casing, a plurality of switch contacts therein disposed lengthwise about the axis thereof and a switch contact disposed axially in the lower end of said casing, an electric circuit including said contacts, a lever disposed axially of the casing for combined laterally swinging and longitudinal movement with respect to the casing, said lever having a head thereon constituting a switch contact selectively engageable by a lateral-swinging of the lever with said longitudinally disposed switch contacts, a spring-supported contact member disposed axially of the casing and in constant engagement with the lever contact head in all positions thereof, and an auxiliary switch contact carried by said spring-supported contact member and engageable with the axially disposed contact element upon the longitudinal movement of said lever, the contact head of the latter being within engageable range of the longitudinal casing contacts in all positions of the lever for closing the circuit thereof independently of or jointly with the auxiliary switch contacts.

8. An electric switch of the character described, comprising a tubular-like casing having a longitudinal switch contact on the interior of its side wall and one transversely of its bottom, a member arranged in said casing for movement axially thereof and having a contact element at its upper end opposite said longitudinal switch contact and a second contact element at its lower end for engagement with said transverse switch contact, a spring for normally holding said contact-carrying member in an elevated position clear of said transverse switch contact, and a combined laterally swinging and longitudinally movable lever mounted on said casing and having a contact head at its lower end in constant bearing engagement with the opposing upper contact element of said axially movable member, said lever-head being engageable with said longitudinal switch contact upon a laterally swinging movement of its lever and the second contact of said axially movable member being engageable with the transverse switch contact of the casing upon a longitudinal displacement of said lever.

EUGENE W. KNOWLTON.